United States Patent
Higuchi (10) Patent No.: US 9,583,999 B2
(45) Date of Patent: Feb. 28, 2017

(54) PERMANENT MAGNET ROTATING MACHINE

(75) Inventor: Dai Higuchi, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 60 days.

(21) Appl. No.: 13/575,455

(22) PCT Filed: Feb. 4, 2011

(86) PCT No.: PCT/JP2011/052392
§ 371 (c)(1),
(2), (4) Date: Jul. 26, 2012

(87) PCT Pub. No.: WO2011/096521
PCT Pub. Date: Aug. 11, 2011

(65) Prior Publication Data
US 2012/0299408 A1 Nov. 29, 2012

(30) Foreign Application Priority Data
Feb. 5, 2010 (JP) ................................ 2010-024259

(51) Int. Cl.
*H02K 21/24* (2006.01)
*H02K 1/27* (2006.01)
(Continued)

(52) U.S. Cl.
CPC ........... *H02K 21/24* (2013.01); *H02K 1/2793* (2013.01); *H02K 1/32* (2013.01); *H02K 9/06* (2013.01)

(58) Field of Classification Search
CPC ........ H02K 1/2793; H02K 21/24; H02K 1/32; H02K 9/06
(Continued)

(56) References Cited

U.S. PATENT DOCUMENTS

| 7,345,385 B2* | 3/2008 | Kreitzer ................... H02K 9/18 310/52 |
| 7,705,496 B2* | 4/2010 | Zisler ....................... H02K 9/14 310/58 |

(Continued)

FOREIGN PATENT DOCUMENTS

| EP | 1 830 371 A1 | 9/2007 |
| EP | 2 131 474 A1 | 12/2009 |

(Continued)

OTHER PUBLICATIONS

JP 2008187792 A English abstract.*
(Continued)

*Primary Examiner* — Dang Le
*Assistant Examiner* — Leda Pham
(74) *Attorney, Agent, or Firm* — Myers Bigel, P.A.

(57) ABSTRACT

Provided is a technology for enhancing the reliability of a permanent magnet rotating machine against thermal degradation of a permanent magnet. Specifically, provided is a permanent magnet rotating machine comprising a housing which houses a rotation shaft, a rotor connected to the rotation shaft and configured to rotate together with the rotation shaft, a stator, and permanent magnets fastened to the rotor or the stator; an air intake port provided at one end of the housing and an air exhaust port provided at the other end of the housing, the air intake port and the air exhaust port being configured to allow cooling air to flow through the housing; and a blower for feeding the cooling air to the air intake port; wherein the permanent magnet rotating machine is configured to be driven by magnetic force of the permanent magnets, and among the permanent magnets, a permanent magnet in the air exhaust port side has a higher coercivity than a permanent magnet in the air intake port side.

4 Claims, 8 Drawing Sheets

(51) Int. Cl.
*H02K 1/32* (2006.01)
*H02K 9/06* (2006.01)

(58) Field of Classification Search
USPC .................................. 310/89, 45, 54, 58, 59
See application file for complete search history.

(56) References Cited

U.S. PATENT DOCUMENTS

| | | | |
|---|---|---|---|
| 2003/0038549 A1* | 2/2003 | Pyrhonen | H02K 9/06 310/58 |
| 2004/0135465 A1 | 7/2004 | Smith et al. | |
| 2004/0145263 A1 | 7/2004 | Kojima et al. | |
| 2007/0228847 A1 | 10/2007 | Kim | |
| 2008/0054736 A1* | 3/2008 | Miyata | H02K 1/02 310/44 |
| 2008/0245442 A1 | 10/2008 | Nakamura et al. | |
| 2010/0007232 A1* | 1/2010 | Komuro | H01F 1/0577 310/156.01 |
| 2010/0253085 A1 | 10/2010 | Minowa et al. | |

FOREIGN PATENT DOCUMENTS

| | | | |
|---|---|---|---|
| JP | 9-252555 A | | 9/1997 |
| JP | 2004-229405 A | | 8/2004 |
| JP | 2004-282813 A | | 10/2004 |
| JP | 2005304204 A | * | 10/2005 |
| JP | 2006-005990 A | | 1/2006 |
| JP | 2008-061333 A | | 3/2008 |
| JP | 2008-187792 A | | 8/2008 |
| JP | 2008187792 A | * | 8/2008 |
| JP | 2008-306922 A | | 12/2008 |
| JP | 2009-072009 A | | 4/2009 |
| JP | 2009-254092 A | | 10/2009 |
| JP | 2010213516 A | * | 9/2010 |
| WO | WO 2006/043348 A1 | | 4/2006 |

OTHER PUBLICATIONS

JP 2010213516 A English abstract.*
JP 2005304204 A machine translation Apr. 3, 2016.*
Office Action corresponding to Japanese Patent Application No. 2011-552834; Mailed Nov. 15, 2013; 6 pages.
Extended European Search Report, EP Application No. 11739869.3, Nov. 25, 2016, 9 pages.

* cited by examiner

PERMANENT MAGNET ROTATING MACHINE

RELATED APPLICATIONS

This application is a 35 U.S.C. §371 national stage application of PCT Application No. PCT/JP2011/052392, filed on Feb. 4, 2011, which claims priority from Japanese Patent Application No. 2010-024259, filed Feb. 5, 2010, the contents of which are incorporated herein by reference in their entireties.

TECHNICAL FIELD

The present invention relates to a permanent magnet rotating machine usable as a motor, a power generator or the like.

BACKGROUND ART

Owing to their excellent magnetic properties, Nd—Fe—B permanent magnets have been used in an increasingly wide range of applications. Recently, also in the field of rotating machines such as motors and power generators, permanent magnet rotating machines using Nd—Fe—B permanent magnets have been developed to follow the trend toward miniaturization, weight reduction, performance improvement, and energy saving of devices.

A permanent magnet in a rotating machine is under such an environment that the permanent magnet is extremely likely to be demagnetized because of exposure to high temperature due to heat generated by windings and an iron core and also because of a demagnetizing field generated by the windings. For this reason, there is a demand for a Nd—Fe—B sintered magnet which has a coercivity at or above a certain level, and an as-high-as-possible remanence. Here, the coercivity is an indicator of heat resistance and demagnetization resistance, while the remanence is an indicator of the magnitude of a magnetic force. An alloying process by grain boundary diffusion is known as a method for manufacturing an R—Fe—B sintered magnet having a high coercivity wherein R represents at least one element selected from rare earth elements inclusive of Y and Sc (Patent Document 1). In addition, by using the alloying process by grain boundary diffusion, a permanent magnet rotating machine has been proposed which comprises an R—Fe—B sintered magnet being free from the reduction in remanence and having a high coercivity especially at an end portion of the permanent magnet (Patent Document 2). Patent Document 3 proposes an arrangement of permanent magnets in which the space inside an axial gap-type permanent magnet rotating machine can be used at a high efficiency.

PRIOR ART DOCUMENT

Patent Document

[Patent Document 1] WO2006-043348
[Patent Document 2] Japanese Patent Application Unexamined Publication No. 2008-61333
[Patent Document 3] Japanese Patent Application Unexamined Publication No. 2009-72009

DISCLOSURE OF THE INVENTION

Problem to be Solved by the Invention

To prevent deterioration of magnetic properties due to heat generated by windings or an iron core, employed are chemical approaches by which the performances of the material of the above-described permanent magnet are enhanced, and physical approaches by which the generated heat is cooled. In the latter, a permanent magnet is cooled by feeding cooling air thereto by use of a blower. However, there still remains a demand to further increase the reliability of a permanent magnet rotating machine against the thermal degradation of the permanent magnet.

Solutions to the Problem

The present inventors have examined the cause of decrease in efficiency of a rotating machine in which permanent magnets are cooled by cooling air from a blower, and have found that the degree of thermal degradation of the permanent magnets varies and this thermal degradation is caused especially by degradation of a permanent magnet in an air exhaust port side. In other words, the present inventors have found that the rise in temperature of cooling air itself which flows from an air intake port side to the air exhaust port side causes the thermal degradation of the permanent magnets. This finding leads to the present invention.

The present invention provides a permanent magnet rotating machine comprising:

a housing which houses a rotation shaft, a rotor connected to the rotation shaft and configured to rotate together with the rotation shaft, a stator, and permanent magnets fastened to the rotor or the stator;

an air intake port provided at one end of the housing and an air exhaust port provided at the other end of the housing, the air intake port and the air exhaust port being configured to allow cooling air to flow through the housing; and a blower for feeding the cooling air to the air intake port, wherein the permanent magnet rotating machine is configured to be driven by magnetic force of the permanent magnets, and among the permanent magnets, a permanent magnet in the air exhaust port side has a higher coercivity than a permanent magnet in the air intake port side.

The stator may be fixed directly or indirectly to the housing. The clause "a permanent magnet in an air exhaust port side has a higher coercivity than a permanent magnet in an air intake port side" also includes coercivities of permanent magnets gradually increased from the air intake port side to the air exhaust port side.

Effect of the Invention

According to the present invention, the permanent magnet in the air exhaust port side has a higher coercivity than the permanent magnet in the air intake port side. This makes it possible to suppress thermal degradation of the permanent magnets and decreases in driving efficiency and generation efficiency of the permanent magnet rotating machine.

EMBODIMENTS FOR CARRYING OUT THE INVENTION

The rise in the temperature of cooling air itself which flows from an air intake port side to an air exhaust port side in a housing causes thermal degradation of a permanent magnet. Especially when the ratio L/D is one or greater, where L represents the length of the inside of the housing along the rotation axis of a rotation shaft, and D represents the diameter of a cross-section of the inside of the housing, the cross-section being perpendicular to the rotation axis of the rotation shaft, the temperature distribution of the cooling air which flows from the air intake port side to the air exhaust port side along the rotation axis is very influential. Although the environment depends on the conditions of use, for example, when a permanent magnet rotating machine is used as a wind power generator, and the outside air is introduced for cooling by use of a blower, the temperature of the air rises immediately to 100° C. in the vicinity of the air intake port, and the temperature of air exhausted from the air exhaust port reaches at least 120° C. Accordingly, a permanent magnet in the air exhaust port side is likely to be demagnetized, which lowers the efficiency of the generation.

According to the present invention, among the permanent magnets used in the permanent magnet rotating machine, a permanent magnet in the cooling air exhaust port side has a higher coercivity than a permanent magnet in the air intake port side. Conventionally, it is conceived that, to suppress the decrease in the generation efficiency of a power generator or the decrease in the driving efficiency of a motor, the heat resistance of all permanent magnets used should be increased. However, these decreases can surprisingly be suppressed only by increasing the coercivities of some of the permanent magnets. This is advantageous also in terms of costs.

According to the present invention, the coercivities of the permanent magnets has a distribution, and the remanences Br of the permanent magnets are preferably substantially identical (preferably, the difference therebetween is within the range of ±0.02 tesla). When the difference in remanences Br between the permanent magnets in the air exhaust port side and those in the air intake port side is large, the torque lowers, thereby lowering the generation efficiency and the driving efficiency. Accordingly, it is preferable that the coercivity of the permanent magnet in the air exhaust port side be made higher than that of the permanent magnet in the air intake port side, while the remanences Br of the permanent magnets are maintained at substantially identical levels.

The performance of a magnet product is generally represented by remanence Br and intrinsic coercivity Hcj. Accordingly, a permanent magnet having a higher coercivity Hcj than the permanent magnet in the air intake port side may be selected as the permanent magnet in the air exhaust port side, while the remanences Br thereof are maintained at substantially identical levels. As will be described later, a permanent magnet whose coercivity is increased by a surface treatment using the later-described alloying process by grain boundary diffusion (for example, Patent Document 1) may be used as the permanent magnet in the air exhaust port side.

The permanent magnet used in the permanent magnet rotating machine of the present invention includes, but not particularly limited, preferably a sintered magnet body having an $R^1$—Fe—B composition including a Nd—Fe—B based sintered magnet, wherein $R^1$ represents at least one selected from rare earth elements inclusive of Y and Sc. Preferably, among the sintered magnet body having an $R^1$—Fe—B composition, a sintered magnet body having a higher coercivity Hcj than the permanent magnet in the air intake port side may be selected as the permanent magnet in the air exhaust port side, while the remanences Br thereof are maintained at substantially identical levels.

In the above-described case, a permanent magnet having a higher coercivity Hcj than the permanent magnet in the air intake port side is selected as the permanent magnet in the air exhaust port side, while the remanences Br of the permanent magnets are maintained at substantially identical levels. Alternatively, more preferably, the same kind of permanent magnets may be used as the permanent magnet in the air exhaust port side and the permanent magnet in the air intake port side, while the permanent magnet which have been subjected to a surface treatment for increasing the coercivity using an alloying process by grain boundary diffusion may be used in the air exhaust port side. The surface treatment using the alloying process by grain boundary diffusion is advantageous in that the coercivity can be increased, while the remanence Br is maintained at a substantially identical level.

The permanent magnet in the air exhaust port side, which has increased coercivity by being subjected to the surface treatment using the alloying process by grain boundary diffusion, is preferably a sintered magnet body of $R^1$—Fe—B-based composition wherein $R^1$ represents at least one selected from rare earth elements inclusive of Y and Sc, and is obtained by heating the sintered magnet body and the powder on a surface of the sintered magnet body at a temperature equal to or lower than a sintering temperature of the sintered magnet body under vacuum or in an inert gas, the powder containing at least one selected from an oxide of $R^2$, a fluoride of $R^3$ and an oxyfluoride of $R^4$ wherein $R^2$, $R^3$ and $R^4$ each independently represents at least one element selected from rare earth elements inclusive of Y and Sc.

The sintered magnet body having an $R^1$—Fe—B-based composition comprises $R^1$, Fe and B. $R^1$ represents at least one selected from rare earth elements inclusive of Y and Sc, and specific examples thereof include Y, Sc, La, Ce, Pr, Nd, Sm, Eu, Gd, Tb, Dy, Ho, Er, Yb and Lu. Preferably, $R^1$ comprises at least one selected from the group consisting of Nd, Pr and Dy. These rare earth elements inclusive of Y and Sc account for preferably 10 to 15% by atom, and particularly preferably 12 to 15% by atom, of the entire alloy. More preferably, $R^1$ comprises both or one of Nd and Pr in an amount of 10% by atom or more, and particularly 50% by atom or more. The sintered magnet body preferably comprises B in an amount of preferably 3 to 15% by atom, more preferably 4 to 8% by atom. In addition, the sintered magnet body may comprise at least one selected from Al, Cu, Zn, In, Si, P, S, Ti, V, Cr, Mn, Ni, Ga, Ge, Zr, Nb, Mo, Pd, Ag, Cd, Sn, Sb, Hf, Ta and W in an amount of preferably 0 to 11% by atom, more preferably 0.1 to 5% by atom. The balance is Fe and incidental impurities such as C, N and O. The sintered magnet body preferably comprises Fe in an amount of preferably 50% by atom or more, more preferably 65% by atom or more. Moreover, a part of Fe, for example, 0 to 40% by atom, more preferably 0 to 15% by atom, of Fe may be substituted with Co.

A powder 22 comprising at least one selected from an oxide of $R^2$, a fluoride of $R^3$ and an oxyfluoride of $R^4$ is caused to be present on the surface of the sintered magnet body. Note that $R^2$, $R^3$ and $R^4$ are each independently at least one selected from rare earth elements inclusive of Y and Sc. Preferably, each of $R^2$, $R^3$ and $R^4$ comprises Dy or Tb in an amount of preferably 10% by atom or more, more preferably 20% by atom or more, still more preferably 40% by atom or more. In this case, in consideration of the object of the present invention, it is preferable that, in a powder comprising a fluoride of $R^3$ and/or an oxyfluoride of $R^4$, $R^3$ and/or $R^4$ preferably comprise 10% by atom or more of Dy and/or Tb wherein the total concentration of Nd and Pr in $R^3$ and/or $R^4$ is preferably lower than the total concentration of Nd and Pr in $R^1$.

The oxide of $R^2$, the fluoride of $R^3$ and the oxyfluoride of $R^4$ preferably refer to $R^2{}_2O_3$, $R^3F_3$, and $R^4OF$, respectively, but also include an oxide containing $R^2$ and oxygen, a fluoride containing $R^3$ and fluorine, and an oxyfluoride containing $R^4$, oxygen and fluorine, which are capable of achieving the effect of the present invention. Examples of such compounds include $R^2O_n$, $R^3F_n$ and $R^4O_mF_n$ (m and n are each any positive number), and those which have $R^2$, $R^3$ or $R^4$ partially substituted by a metal element or elements or which are stabilized with a metal element or elements.

Examples of a method for causing the powder to be present on the surface (powder treatment method) include a method comprising the steps of dispersing in water or an organic solvent a fine powder comprising at least one selected from an oxide of $R^2$, a fluoride of $R^3$ and oxyfluoride of $R^4$, immersing a magnet body in the obtained slurry, and then drying the magnet body by hot air, under vacuum, or naturally. Application by spraying or the like may also employable. Whichever specific method is employed, it is characteristic that the method allows a very facile mass treatment. The particle diameter of the fine powder has an influence on the reactivity of the component of $R^2$, $R^3$ or $R^4$ in the powder when the component is absorbed into the magnet. The smaller the particles are, the larger the contact area for the reaction is. In order to achieve the effect of the present invention, the powder to be present on the surface desirably has an average particle diameter of preferably 100 μm or less, more preferably 10 μm or less. The lower limit of the average particle diameter is not particularly limited, and preferably 1 nm or more. Note that the average particle diameter can be determined, for example, as a weight average value $D_{50}$ (namely, the particle diameter at 50% cumulative weight or the median diameter) by use of a particle size distribution measuring apparatus based on a laser diffraction method, or the like.

The higher the abundance ratio of the powder present in a surface space of the magnet becomes, the larger the amount of $R^2$, $R^3$ or $R^4$ absorbed becomes. Hence, to achieve the object of the present invention, the abundance ratio of the powder is preferably 10% by volume or higher, more preferably 40% by volume or higher, as an average value in a space surrounding the magnet within a distance of 1 mm from the magnet surface.

The powder on the magnet surface comprises the oxide of $R^2$, the fluoride of $R^3$, the oxyfluoride of $R^4$, or a mixture thereof. In addition, the powder may comprise at least one of carbides, nitrides, hydroxides and hydrides of $R^5$ wherein $R^5$ is at least one selected from rare earth elements inclusive of Y and Sc), or a mixture or a composite thereof. Meanwhile, when a fluoride of $R^3$ and/or an oxyfluoride of $R^4$ is used, the powder may comprise an oxide of $R^5$. Moreover, to promote the dispersiveness or the chemical or physical adsorption of the powder, the powder may also comprise a fine powder of boron, boron nitride, silicon, carbon or the like, or an organic compound such as stearic acid (an aliphatic acid). To perform the invention highly efficiently, the oxide of $R^2$, the fluoride of $R^3$, the oxyfluoride of $R^4$, or the mixture thereof is comprised in an amount of 10% by weight or more, preferably 20% by weight or more in the entire amount of the powder. Particularly, it is recommended that the oxide of $R^2$, the fluoride of $R^3$ or the oxyfluoride of $R^4$ be comprised as a main component in an amount of 50% by weight or more, more preferably 70% by weight or more, further preferably 90% by weight or more in the entire amount of the powder.

The magnet and the powder comprising the oxide of $R^2$, the fluoride of $R^3$, the oxyfluoride of $R^4$, or a mixture thereof on a surface of the magnet are heated under vacuum or in an atmosphere of an inert gas such as argon or helium (this heat treatment is also referred to as an "absorption treatment").

The temperature for the absorption treatment is at or below the sintering temperature of the sintered magnet body. If the treatment is conducted at a temperature above the sintering temperature (referred to as $T_s°$ C.) of the sintered magnet body, caused are the following problems such as (1) to (3): (1) the texture of the sintered magnet is altered so that high magnetic properties cannot be obtained; (2) the processed dimensions are not maintained because of thermal deformation; and (3) the remanence is lowered because the diffused R diffuses not only to the crystal grain boundary surface of the magnet but also to the inside thereof. Hence, the treatment temperature is at or below the sintering temperature, and preferably at or below $(T_s-10)°$ C. Note that the lower limit of the temperature may be determined as appropriate, and may be typically 350° C. or above. The time for the absorption treatment may be 1 minute to 100 hours. When the time is less than 1 minute, the absorption treatment may not be completed. When the time exceeds 100 hours, there often arises a problem that alteration of the texture of the sintered magnet, unavoidable oxidation, or vaporization of a component may adversely affect the magnetic properties. The time may be more preferably five minutes to eight hours, still more preferably ten minutes to six hours.

Through the absorption treatment as described above, the concentration of $R^2$, $R^3$ or $R^4$ comprised by the powder on the magnet surface is elevated in the grain boundary phase components rich in the rare earth element or elements in the magnet, and substitution by $R^2$, $R^3$ or $R^4$ occurs near a surface portion of the $R^1$—Fe—B composition. When the powder comprises a fluoride of $R^3$ or an oxyfluoride of $R^4$, the fluorine comprised by the powder is partially absorbed into the magnet together with $R^3$ or $R^4$. This markedly promotes the supply of $R^3$ or $R^4$ from the powder and the diffusion thereof at the crystal grain boundary of the magnet.

The rare earth element comprised by the oxide of $R^2$, the fluoride of $R^3$, or the oxyfluoride of $R^4$ is at least one selected from rare earth elements inclusive of Y and Sc. Dy and Tb are elements which have especially large effects to enhance the crystal magnetic anisotropy by being concentrated in the surface portion. Hence, regarding the rare earth element comprised by the powder, the percentage of Dy and Tb in total is preferably 10% by atom or higher. More preferably, the percentage is 20% by atom or higher. In addition, preferably, the total concentration of Nd and Pr comprised by $R^2$, $R^3$, and $R^4$ are lower than the total concentration of Nd and Pr comprised by $R^1$.

This absorption treatment results in efficient increase in coercivity of the $R^1$—Fe—B sintered magnet with substantially no reduction in remanence thereof.

The permanent magnet rotating machine of the present invention can be used, for example, as the radial gap-type motor comprising, inside a housing, a rotation shaft;

a rotor comprising a rotor core connected to the rotation shaft and configured to rotate along with the rotation shaft, and two or more permanent magnets attached to an outer peripheral surface of the rotor core; and a stator being disposed around the outer peripheral surface of the rotor with a gap provided therebetween and comprising a stator core comprising multiple slots and coils wound on the stator core.

The stator may be fixed directly or indirectly to the housing. The radial gap-type motor comprises a blower for feeding cooling air for controlling the heat generated in the housing. In order to allow the cooling air to flow through the housing, for example, an air intake port and an air exhaust port are arranged so as to allow the cooling air to flow through the gap between the outer peripheral surface of the rotor and the stator, and/or a hole being provided inside the rotor core and extending along the rotation axis of the rotor.

Figure 1:
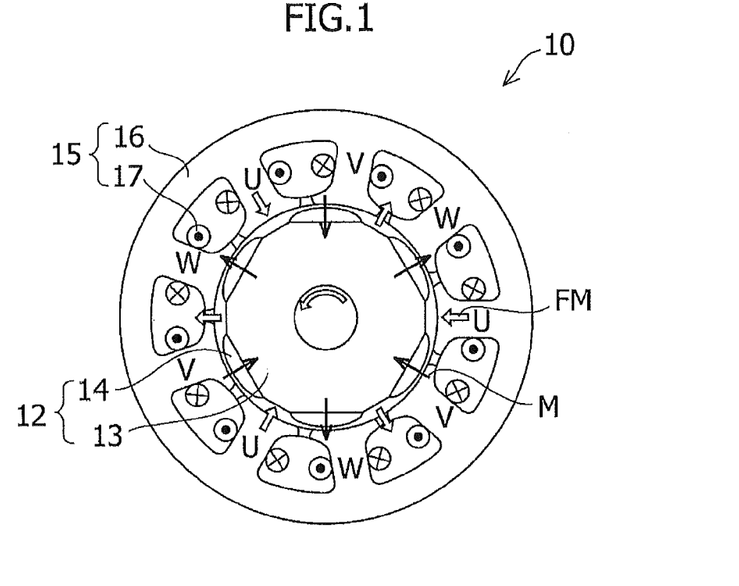
FIG. 1 shows a front view toward the rotation axis in an embodiment of a radial gap-type motor.

FIG. 1 shows a front view toward the rotation axis in an example of a radial gap-type motor.

A radial gap-type motor 10 comprises a rotation shaft 11, a rotor 12, and a stator 15. The rotor 12 comprises two or more permanent magnets 14 attached to an outer peripheral surface of a rotor core 13. The stator 15 is disposed around the outer peripheral surface of the rotor 12 with a gap provided therebetween, and comprises a stator core 16 having two or more slots, and coils 17 wound on teeth. In the embodiment of the permanent magnet rotating machine shown in FIG. 1, the number of permanent magnet poles is six, the number of teeth is nine, and the arrow across each permanent magnet indicates the direction of the magnetization of the permanent magnet. The permanent magnets are aligned in a parallel magnetic field, and the direction of easy magnetization is parallel to a center line of the magnets. The coils are wound on the teeth as a concentrated winding and connected in the Y connection of three phases: U, V and W phases. The solid circle of each coil indicates that the coil winding direction is forward and the symbol x of each coil indicates that the coil winding direction is backward, with respect to the plane of paper. FM indicates the direction of field magnet, and M indicates the direction of magnetization.

Figure 2:
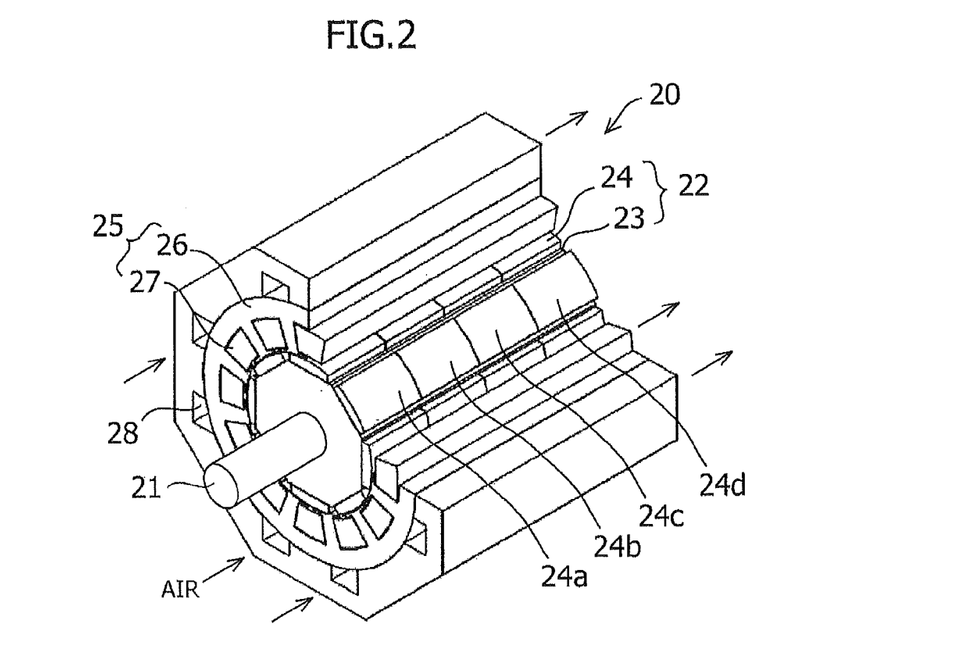
FIG. 2 shows the structure in another embodiment of a radial gap-type motor.

FIG. 2 shows the structure in another embodiment of a radial gap-type motor.

A radial gap-type motor 20 comprises a rotation shaft 21, a rotor 22, and a stator 25. The rotor 22 comprises two or more permanent magnets 24 attached to an outer peripheral surface of a rotor core 23. The stator 25 is disposed around the outer peripheral surface of the rotor 22 with a gap provided therebetween, and comprises a stator core 26 having two or more slots, and coils 27 wound on teeth. In FIG. 2, magnets 24a, 24b, 24c, and 24d are arranged along the rotation axis. Air introduced by a blower through an air intake port (not shown) of the housing passes through holes 28 provided along the rotation shaft 21 inside a rotor core 23 and is discharged through an air exhaust port (not shown) of the housing. When each of the permanent magnets 24c and 24d located in the air exhaust port side has higher coercivities than the permanent magnets 24a and 24b in the air intake port side, the decrease in the driving efficiency of the rotating machine can be suppressed.

The permanent magnet rotating machine of the present invention can also be used as an axial gap-type motor.

The permanent magnet rotating machine of the present invention can be used, for example, as an axial gap-type power generator comprising:

a rotation shaft, two end rotors being separated by space therebetween in the axial direction of the rotation shaft and being rotatable integrally with the rotation shaft, each of the two end rotors comprising an end rotating disk and a permanent magnet on each opposing surface of the two end rotating disks, at least one inner rotor rotatable integrally with the rotation shaft, and comprising a rotating disk provided in a gap formed by the two end rotors while being spaced therefrom, and a permanent magnet supported by the rotating disk and at least two stators isolated from the rotation of the rotation shaft, each comprising a fixed disk arranged in each of gaps formed by the end rotors and the inner rotor, and a stator coil supported by the fixed disk.

At least three disk-like rotors comprising permanent magnets thereon are disposed, and stators comprising stator coils are arranged in at least two gaps formed by these rotors. Thus, at least five of rotors and stators in total are alternately stacked while being spaced from each other in the rotation axis direction. The stators may be fixed directly or indirectly to the housing. By providing the rotation shaft with a propeller, a wind power generator can be provided.

The axial gap-type power generator comprises a blower for feeding cooling air for controlling the heat generated in the housing. In order to allow the cooling air to flow through the housing, for example, an air intake port and an air exhaust port are arranged so as to allow the cooling air to flow through gaps between the housing and the outer peripheral surfaces of the end rotors and the inner rotor, and/or through holes formed inside of the end rotors, inside of the inner rotor and optionally inside of the stators along the rotation axis of the rotation shaft.

Preferably, as shown in Patent Document 3, each of the permanent magnets in the power generator have a magnetization direction in the axial direction of the rotation shaft, and the permanent magnets are arranged at equal intervals on each of the rotating disks of the end rotors and the inner rotor in such a manner as to have four or more magnetic poles arranged on the circumference of each of two or more concentric circles having different diameters and having their common center located at the rotation axis. Three or more of the stator coils are arranged at equal intervals on the circumference of each concentric circle on each of the fixed disks wherein the concentric circle on each of the fixed disks faces to the corresponding one of the concentric circles on which the permanent magnets of the rotating disks are arranged.

Figure 3:
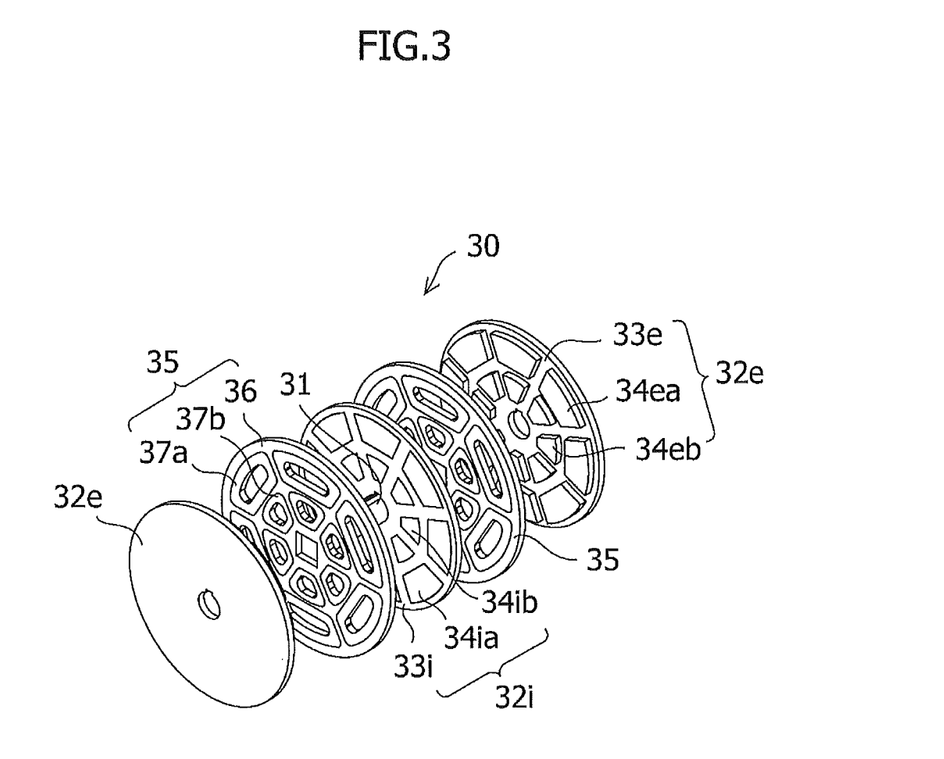
FIG. 3 shows an embodiment of an axial gap-type power generator.
Figure 4A:
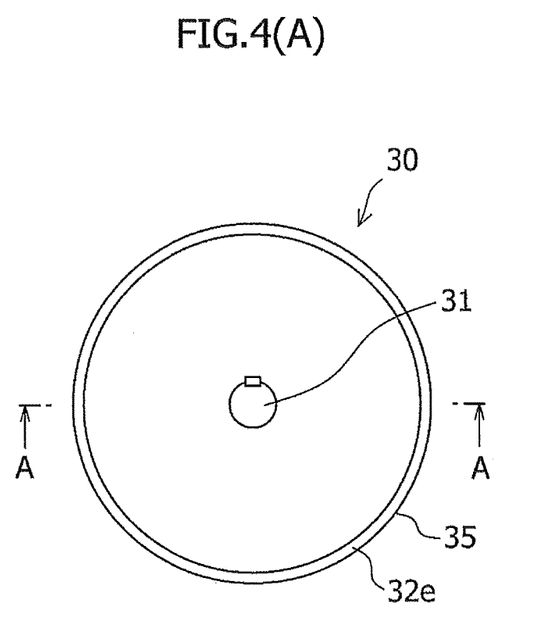
FIG. 4(A) is a front view toward the rotation axis in the power generator shown in FIG. 3.
Figure 4B:
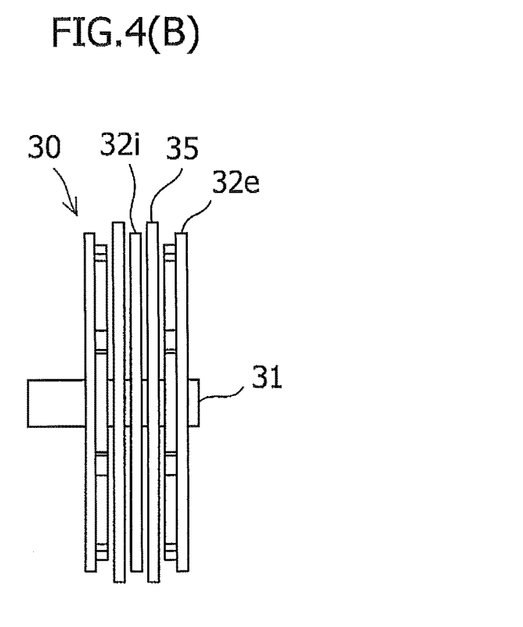
FIG. 4(B) is a lateral view thereof.
Figure 4C:
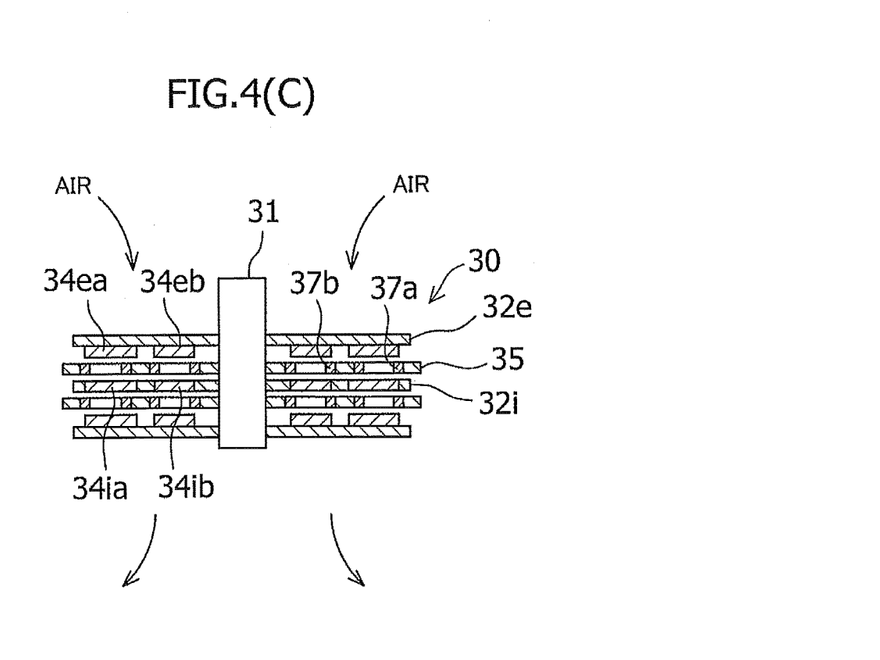
FIG. 4(C) is a cross-sectional view taken along the line A-A.

FIGS. 3 and 4 show an embodiment of such an axial gap-type power generator. FIG. 3 is a perspective view of the axial gap-type power generator. FIG. 4(A) is a front view toward the rotation axis; FIG. 4(B) is a lateral view thereof, and FIG. 4(C) is a cross-sectional view taken along the line A-A. In FIG. 4(C), the flow of the air is illustrated.

A rotation shaft 31 transmitting the torque is supported rotatably by a housing (not shown) of a power generator with a bearing interposed therebetween. One end of the rotation shaft 31 is capable of being coupled with a propeller or the like so that the torque can be transmitted to a power generator 30. Rotors 32e and 32i are fastened to the rotation shaft 31, and the rotors rotate synchronously with the rotation shaft. The power generator 30 comprises: the rotors 32e and 32i having two or more permanent magnets 34ea, 34eb, 34ia and 34ib attached to disk-shaped structures 33e and 33i connected to the rotation shaft; and stators 35 having two or more coils 37a and 37b attached to disk-shaped structures 36 at positions facing the rotation orbit of the permanent magnets. The power generator 30 has a structure in which these rotors and stators are alternately stacked on each other. In this embodiment, there are three rotors, and the stators with the coils are interposed between the rotors. Air introduced by the blower through an air intake port (not shown) of the housing flows from the rotor 32e at one end along the rotation shaft 31, and passes through the rotor 32e at the other end, and is discharged from an air exhaust port (not shown). When the permanent magnets 34ea and 34eb comprised by the end rotor 32e in the air exhaust port side, and, if a plurality of inner rotors 32i exist, the permanent magnets 34ia and 34ib in the air exhaust port side have higher coercivities than the permanent magnets in the air intake port side, the decrease in generation efficiency of the rotating machine can be suppressed.

Figure 8A:
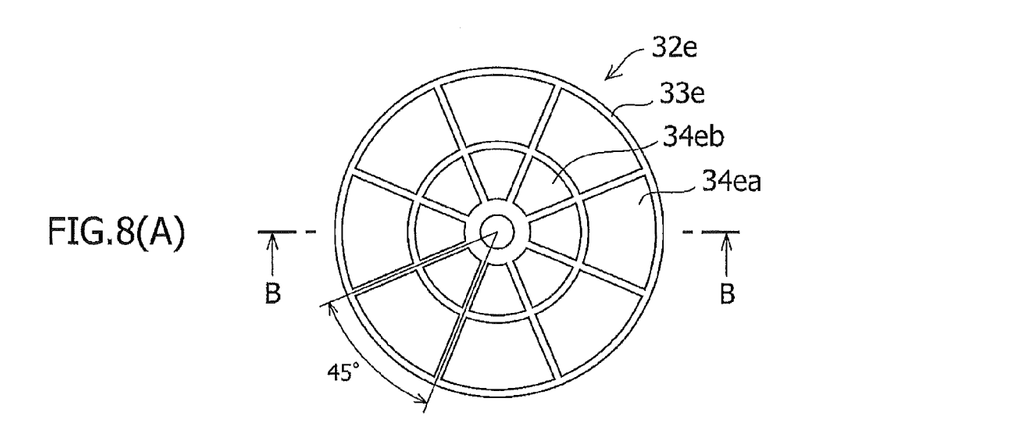
FIG. 8(A) shows a view of the end rotor used in Example 2 toward the rotation axis in the permanent magnet side and FIG. 8(B) shows a cross-sectional view of the end rotor used in Example 2 taken along the line B-B, together with the dimensions.
Figure 8B:
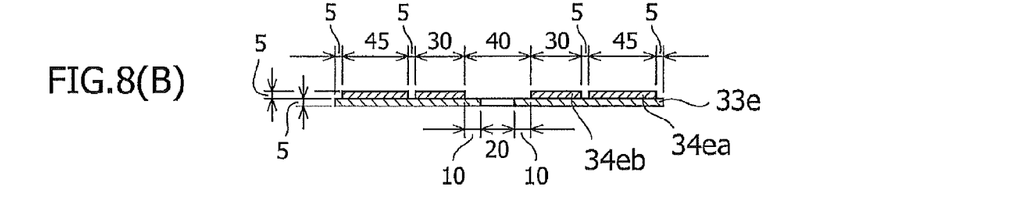

Further, in order to make the air flow near the rotation shaft 31 better, through-holes may be formed in one or both of the rotors 32e and 32i and the stators 35. An example of the rotor having through-holes is shown in FIG. 8.

Figure 10A:
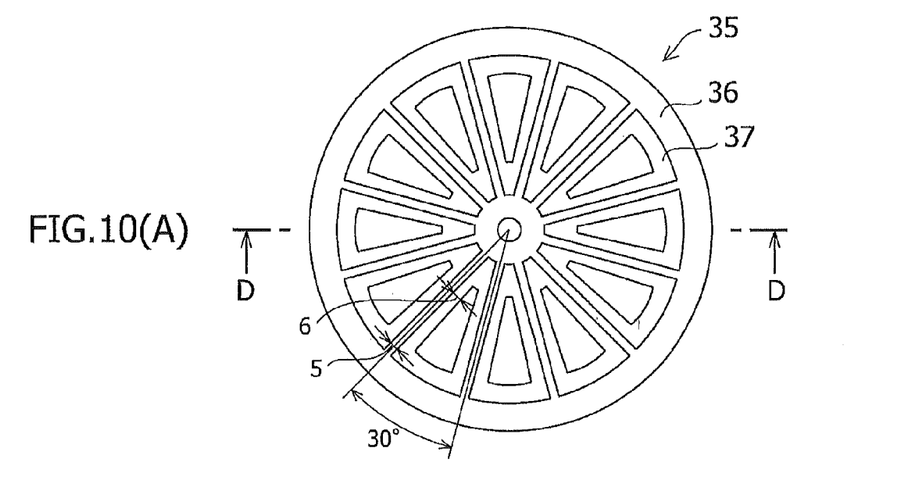
FIG. 10(A) shows a view of the stator used in Example 2 toward the rotation axis and FIG. 10(B) shows a cross-sectional view of the stator used in Example 2 taken along the line D-D, together with the dimensions.
Figure 10B:
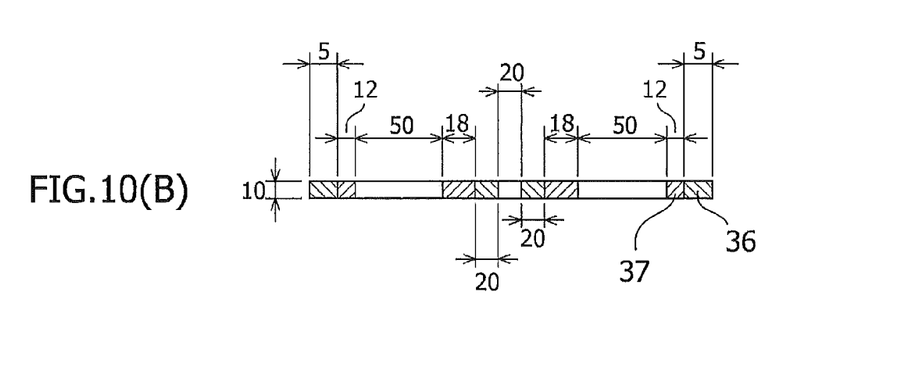

When only one or none of the rotors 32e and 32i and the stators 35 has through-holes, the air which has flown through the rotation shaft 31 collides with the rotors and stators, and flows toward the radial direction temporarily so that the through-holes may be formed in the radial direction side as shown in FIG. 10.

The permanent magnet rotating machine of the present invention can also be used as a radial gap-type power generator.

In the above-described example of the permanent magnet rotating machine of the present invention, the permanent magnets are fastened to the rotors, and the coils are fastened to the stators. However, the permanent magnets may be fastened to the stators, and the coils may be fastened to the rotors.

EXAMPLES

Hereinafter, the present invention will be described specifically based on Examples and Comparative Examples. It should not be construed that the present invention is limited to Examples below.

1. Radial Gap-Type Motor (Example 1 and Comparative Examples 1 to 3)

Motor Used in Example 1 and Comparative Examples 1 to 3

Figures 5A, 5B:
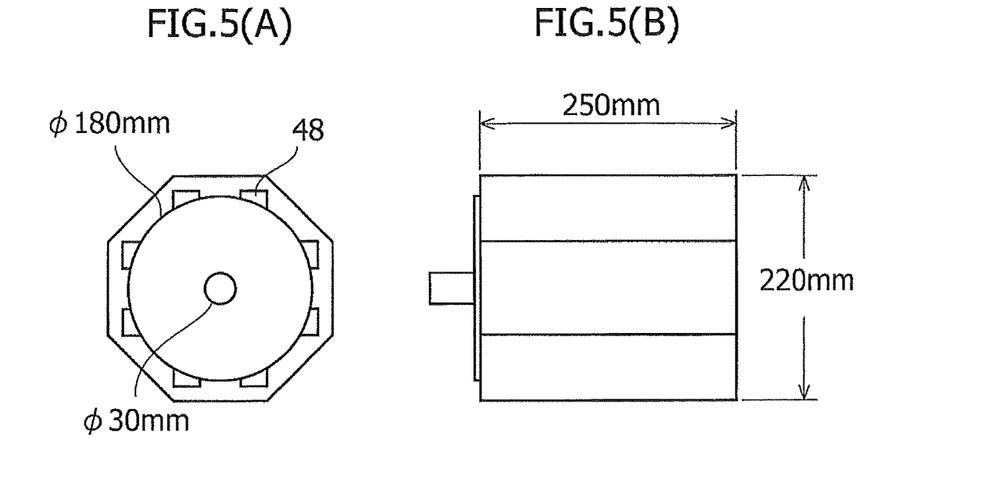
FIG. 5 shows a rotor of an SPM motor used in Example 1.

As shown in FIG. 5, an 8-pole 12-slot SPM (Surface Permanent Magnet) motor was fabricated. The SPM motor had a rotor diameter of 180 mm, an outer diameter (inclusive of a stator frame) of 220 mm, a shaft length of 250 mm, and a shaft diameter of 30 mm. In a rotor of this motor, one pole comprises four permanent magnets along the axial direction. Regarding the performances of the motor, a torque of 30 Nm was generated at 1000 rpm by use of a magnet having a maximum energy product of 350 kJ/m$^3$. A rated output was set to 3 kW. The number of revolutions of 1000 rpm and a torque of 30 Nm were employed as rated operation conditions. In this motor, cooling holes 48 were provided as shown in FIG. 5. Feeding of air into the holes allowed forcible-air cooling.

Permanent Magnets Used in Example 1 and Comparative Examples 1 to 3

Figure 6:
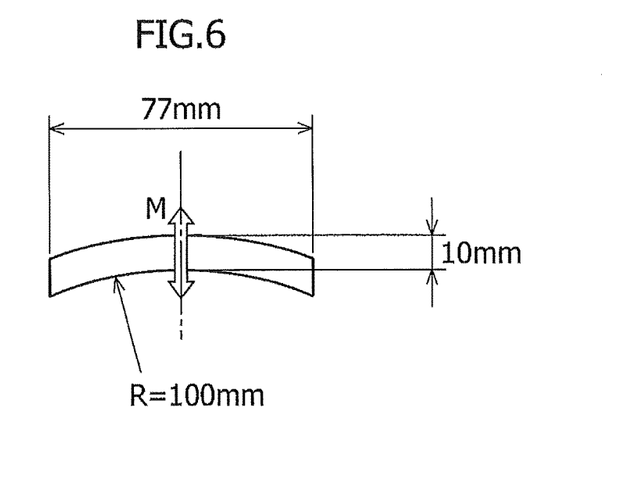
FIG. 6 shows the shape of a magnet used in Example 1.
Figure 7:
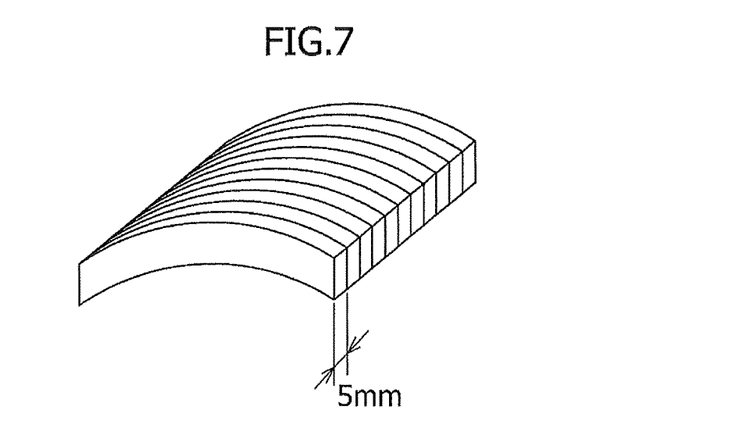
FIG. 7 shows a stack of magnets used in Example 1.

FIG. 6 shows the shape of a magnet used. The magnet had a depth of 55 mm. The magnet had a C-shape and was magnetized in the radial direction. The magnets used in Examples were neodymium-based Nd—Fe—B magnets. Table 1 shows magnetic properties of the magnets. All the magnets had a maximum energy product of 350 kJ/m$^3$ at room temperature. As the permanent magnets, used were four types of magnets A, B, C, and D having the remanences (Br) and the coercivities (iHc) shown in Table 1. The magnet D was obtained by, after application of the grain boundary diffusion method, laminatedly joining eleven magnets each having a thickness of 5 mm to have a length of 55 mm as shown in FIG. 7. To the magnet D, applied was the alloying process by grain boundary diffusion in which the magnet C was used as a base material, the coercivity thereof was increased by applying a fluorine compound containing Tb onto the entirety of the magnet C and then subjecting the resultant magnet to a heat treatment in an Ar atmosphere at 900° C. for 1 hour.

TABLE 1

| magnet | Br (T) | iHc (kA/m) |
|---|---|---|
| A | 1.375 | 875 |
| B | 1.375 | 1114 |
| C | 1.375 | 1273 |
| D | 1.375 | 1671 |

Example 1

As the four permanent magnets along the axial direction of the rotor in the SPM motor, the magnets A, B, C, and D were used in this order from the upstream of the air flow for the forcible cooling. The SPM motor was operated under the rated operation conditions for three hours (a first rated operation), and the temperature on the surface of the rotor at the both ends thereof was measured during the rated operation through a hole provided in a frame, by use of a radiation thermometer. The results of the measurement on the temperatures at the both ends of the rotor are shown as "temperature measured in air intake port side" and "temperature measured in air exhaust port side" in the row of "rated operation" in Table 2. An average of the temperatures at the both ends of the rotor is referred to as the "estimated mean temperature" in Table 2.

Subsequently, the motor was cooled to room temperature. Then, the motor was operated under the rated operation condition for 1 hour (a second rated operation), and the output thereof was measured. The difference in outputs between the first rated operation and the second rated operation is shown in the column "rated operation" in Table 3. Thereafter, the motor was temporarily cooled to room temperature. Then, the motor was further operated for one hour under the condition exceeding the rated operation condition by 20% overload, and the output thereof was measured. The rotor temperature at this time is shown in the row "20% overload operation" in Table 2, and the difference in outputs between the first rated operation and the 20% overload operation is shown in the column "20% overload operation" in Table 3.

In Example 1, as is seen in Table 3, the motor characteristics did not change. Accordingly, it is evident that the permanent magnets used in this rotor were not demagnetized.

Comparative Example 1

Comparative Example 1 was carried out in the same manner as in Example 1 except that four magnets B were used as all of the four permanent magnets along the axial direction of the rotor. The results are shown in Tables 2 and 3.

As shown in Table 3, when the overload operation was carried out, the motor output was reduced by 15%. When the magnets were taken out and observed, among the four magnets of Comparative Example 1, two magnets on the downstream side of the air flow were demagnetized, and particularly the magnet on the most downstream side of air flow was demagnetized by 12%.

Comparative Example 2

Comparative Example 2 was carried out in the same manner as in Example 1 except that four magnets C were used as all of the four permanent magnets along the axial direction of the rotor. The results are shown in Tables 2 and 3.

As shown in Table 3, when the overload operation was carried out, the motor output was reduced by 0.4%. When the magnets were taken out and observed, among the four magnets, the magnet on the most downstream side of the air flow was demagnetized.

Comparative Example 3

Comparative Example 3 was carried out in the same manner as in Example 1 except that four magnets D were used as all of the four permanent magnets along the axial direction of the rotor. The results are shown in Tables 2 and 3.

As shown in Table 3, when the overload operation was carried out, the motor output was not decreased.

The magnet costs relative to the cost of the magnets used in the rotor of Comparative Example 1, and also the magnet costs relative to the cost of magnets used in the rotor of Example 1 are shown in Table 3. The magnets D used in Example 1 and Comparative Example 3 comprised expensive Tb, and the preparation of the magnets D involved a heat treatment step so that the magnets D are more expensive than the magnets A, B, and C. For this reason, in Comparative Example 3 where a larger number of the magnet D was used than in Example 1, the costs were higher and the amount of the rare metal Tb was larger than in Example 1. Accordingly, it has been found that, according to the present invention, the amount of the expensive magnets D can be cut (to ¼ in Example 1), and the inexpensive magnet A having a low coercivity can be used, and the combination of these magnets can improve the performance of a motor and reduce the cost, achieving resource-saving by reducing an amount of a Tb compound or a Dy compound used in the grain boundary diffusion method.

TABLE 2

| | | temp. measured in | | |
|---|---|---|---|---|
| | operation condition | air intake port side (° C.) | air exhaust port side (° C.) | estimated mean temperature (° C.) |
| Example 1 | rated operation | 60 | 80 | 70 |
| | 20% overloaded operation | 70 | 115 | 93 |
| Comp. Ex. 1 | rated operation | 60 | 80 | 70 |
| | 20% overloaded operation | 70 | 115 | 93 |
| Comp. Ex. 2 | rated operation | 60 | 80 | 70 |
| | 20% overloaded operation | 70 | 115 | 93 |
| Comp. Ex. 3 | rated operation | 60 | 80 | 70 |
| | 20% overloaded operation | 70 | 115 | 93 |

TABLE 3

| | difference (%) in outputs before and after operation, output with the same revolution number after the operation under the rated condition | | cost (%) of magnets relative to cost | |
|---|---|---|---|---|
| | rated operation | 20% overloaded operation | in Comp. Ex. 1 | in Example 1 |
| Example 1 | 0 | 0 | 108 | 100 |
| Comp. Ex. 1 | 0 | reduction by 15% | 100 | 93 |
| Comp. Ex. 2 | 0 | reduction by 0.4% | 110 | 102 |
| Comp. Ex. 3 | 0 | 0 | 140 | 130 |

2. Axial Gap-Type Motor (Examples 2 to 4 and Comparative Examples 4 to 9

Motor Used in Example 2 and Comparative Examples 4 to 5

Figure 9A:
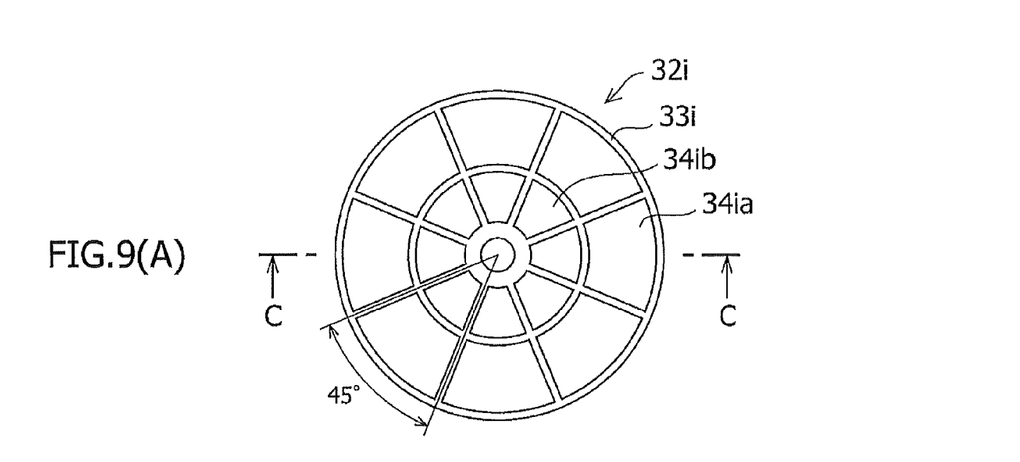
FIG. 9(A) shows a view of the inner rotor used in Example 2 toward the rotation axis and FIG. 9(B) shows a cross-sectional view of the inner rotor used in Example 2 taken along the line C-C, together with the dimensions.
Figure 9B:
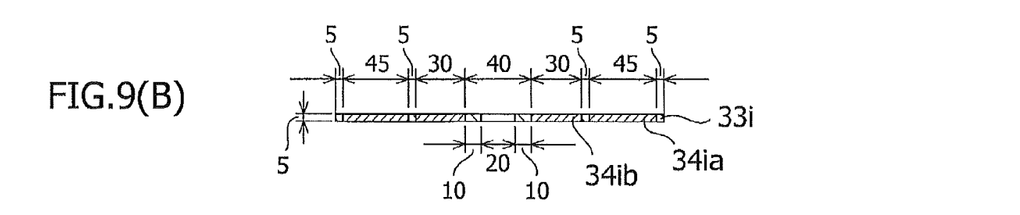

An axial gap-type motor comprising two end rotors 32e, one inner rotor 32i and two stators 35 and corresponding to the axial gap-type power generator was used. The dimensions of the rotor 32e, the rotor 32i and the stators 35 are shown in FIGS. 8 to 10, respectively. The outer diameter of each of the rotors and stators was 230 mm, the number of poles for each of the rotors was eight, and the number of slots for each of the stators was twelve. A magnet used was in the form consisting of two arcs derived from two concentric circles with a central angle of 45°, and two straight lines between two arcs. Since the magnet can be said to be in the form of the pseudo-trapezoid which the parallel lines of the trapezoid has been replaced by two arcs derived from the concentric circles, it is described as the pseudo-trapezoid magnet hereinafter. Two pseudo-trapezoid magnets per pole were arranged in a radial direction and referred to as "inside and outside magnets". The inner arc of the inside magnet was arranged to be on the circumferential line of the concentric circle having a radius of 20 mm, while the inner arc of the outside magnet was arranged to be on the circumferential line of the concentric circle having a radius of 55 mm, so as to constitute one pole. Then the inside and outside magnets were arranged in the circumferential directions at the equal intervals. As a result, the axial gap-type motor having eight poles was fabricated.

Each of the end and inner rotors was made of an iron plate having an outer diameter of 210 mm. The permanent magnets neighboring in the radial direction had the same polarities, the permanent magnets neighboring in the circumferential direction had the different polarities. The permanent magnets were fixed at such positions as described above by using an acrylic adhesive agent.

The stator comprised a Bakelite plate having an outer diameter of 230 mm, an inner diameter of 20 mm and a thickness of 10 mm; and twelve coreless coils arranged in the circumferential direction at the equal intervals. Each coil was in the shape of pseudo-trapezoid having two arcs derived from two concentric circles having inner and outer diameters of 40 and 200 mm, respectively, with a central angle of 30°, and having a thickness of 10 mm with the number of turns of thirty.

The axial gap-type motor was fabricated by using a casing as in FIG. 5 and three rotors and two stators as in FIG. 4, wherein the stator was placed in the middle of each gap of 22 mm between the rotors. The axial gap-type motor was used in Examples 2 to 3 and Comparative Examples 4 to 7.

Permanent Magnets Used in Example 2 and Comparative Examples 4 to 5

A permanent magnet in the form of pseudo-trapezoid having two arcs derived from the concentric circles having an outer diameter of 200 mm and an inner diameter of 110 mm with a central angle of 45°, and a thickness of 5 mm was prepared by grinding a Nd—Fe—B based sintered magnet having the remanence Br of 1.375 (T) and the coercivity iHc of 1273 (kA/m). Each of the two straight line sides of the pseudo-trapezoid permanent magnet was shaven by 2.5 cm inward from each of the two straight lines, and the magnet thus obtained was designated as Magnet E. In addition, a permanent magnet in the form of pseudo-trapezoid having two arcs derived from the concentric circles having an outer diameter of 100 mm and an inner diameter of 40 mm with central angle of 45°, and a thickness of 5 mm was prepared by grinding a Nd—Fe—B based sintered magnet having the same magnetic characteristics. Each of the two straight line sides of the pseudo-trapezoid permanent magnet was shaven by 2.5 cm inward from each of the two straight lines, and the magnet thus obtained was designated as Magnet F.

A permanent magnet in the form of pseudo-trapezoid having two arcs derived from the concentric circles having an outer diameter of 200 mm, an inner diameter of 110 mm with a central angle of 45°, and a thickness of 5 mm was prepared by grinding a Nd—Fe—B based sintered magnet having the remanence Br of 1.375 (T) and the coercivity iHc of 1671 (kA/m). Each of the two straight line sides of the pseudo-trapezoid permanent magnet was shaven by 2.5 cm inward from each of the two straight lines, and the magnet thus obtained was designated as Magnet EH. In addition, a permanent magnet in the form of pseudo-trapezoid having two arcs derived from the concentric circles having an outer diameter of 100 mm and an inner diameter of 40 mm with a central angle of 45°, and a thickness of 5 mm was prepared by grinding a Nd—Fe—B based sintered magnet having the same magnetic characteristics. Each of the two straight line sides of the pseudo-trapezoid permanent magnet was shaven by 2.5 cm inward from each of the two straight lines, and the magnet thus obtained was designated as Magnet FH.

Example 2

Hereinafter, the rotators in the axial gap-type motor are referred to as Rp, Rq and Rr from the upstream to the downstream of the air flow during the forcible air cooling.

The above axial gap-type motor was fabricated by using Magnets F and E as inner and outer magnets of Rp, Magnets FH and EH as inner and outer magnets of Rq, and Magnets FH and EH as inner and outer magnets of Rr, respectively. Regarding the performances of the motor, a torque of 30 Nm was generated at 1000 rpm. A rated output was set to 3 kW. The number of revolutions of 1000 rpm and a torque of 30 Nm were employed as the rated operation condition. The motor was subjected to the rated operation for an hour, cooled sufficiently at room temperature, and then subjected to a 20% overloaded operation for an hour, followed by the measurement of the output. In addition, the temperatures in the air intake port side and in the air exhaust port side were measured after both operations. The results are shown in Tables 4 and 5.

Comparative Example 4

The above axial gap-type motor was fabricated by using Magnets FH and EH as inner and outer magnets of Rp, Magnets FH and EH as inner and outer magnets of Rq, and Magnets FH and EH as inner and outer magnets of Rr, respectively. In the same manner as in Example 2, the output after the rated operation and the 20% overloaded operation was measured, and the temperatures in the air intake port side and in the air exhaust port side were measured after both operations. The results are shown in Tables 4 and 5.

Comparative Example 5

The above axial gap-type motor was fabricated by using Magnets F and E as inner and outer magnets of Rp, Magnets F and E as inner and outer magnets of Rq, and Magnets F and E as inner and outer magnets of Rr, respectively. In the same manner as in Example 2, the output after the rated operation and the 20% overloaded operation was measured, and the temperatures in the air intake port side and in the air exhaust port side were measured after both operations. The results are shown in Tables 4 and 5.

Example 3

Figure 11A:
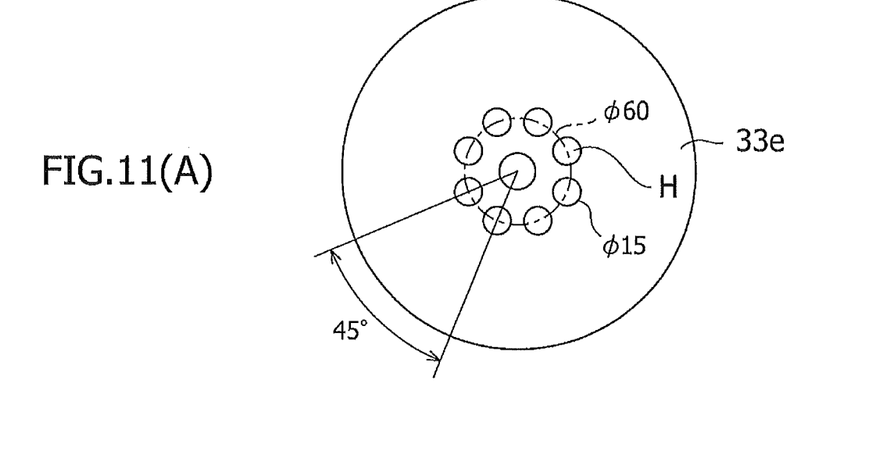
FIG. 11(A) shows a view of the end rotor used in Example 3 toward the rotation axis in the disk-shaped structure side, together with the dimensions.
Figure 11B:
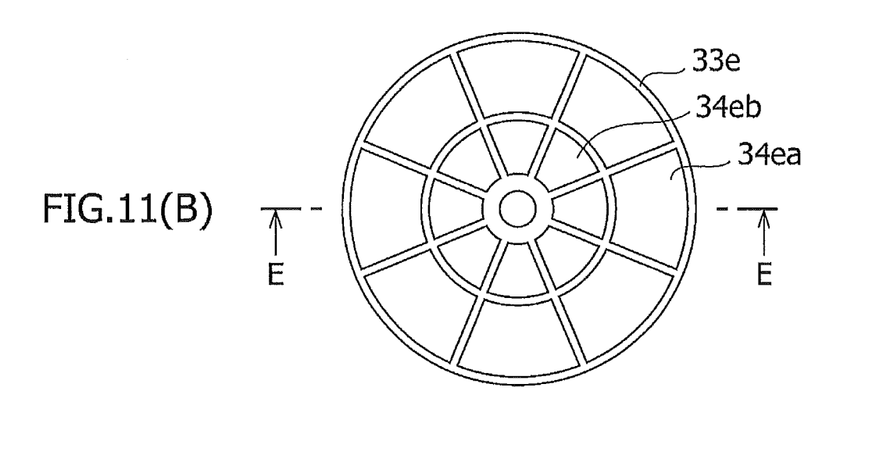
FIG. 11(B) shows a view of the end rotor used in Example 3 toward the rotation axis in the permanent magnet side.
Figure 11C:
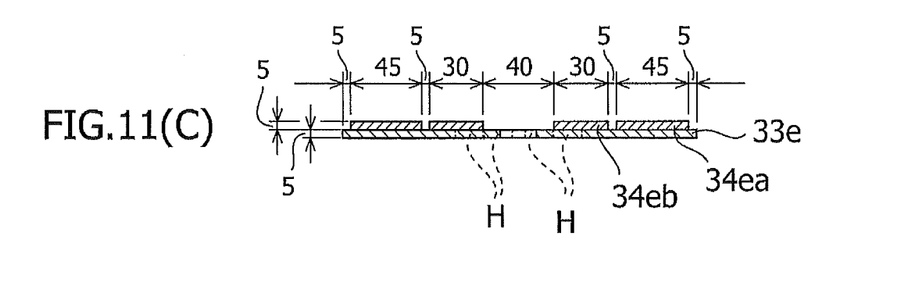
FIG. 11(C) shows a cross-sectional view of the end rotor used in Example 3 taken along the line E-E, together with the dimensions.
Figure 12:
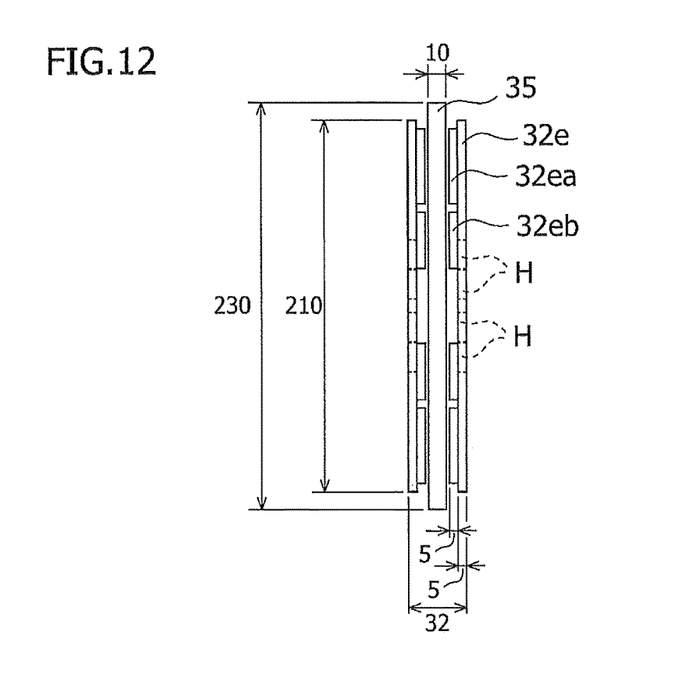
FIG. 12 shows the inner structure of the axial gap-type motor used in Example 4, together with the dimensions.
Figure 13:
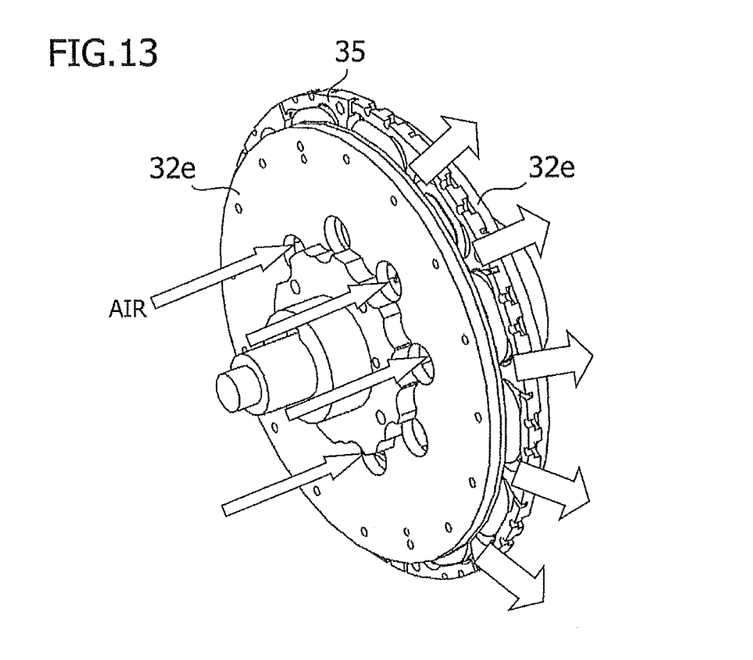
FIG. 13 shows the axial gap-type motor used in Example 4.

The same axial gap-type motor as in Example 2 was fabricated except that through-holes H were made in the iron plates of two end rotors 32e as shown in FIG. 11. Eight through-holes, each having a diameter of 15 mm, were made on the same circumference having a diameter of 60 mm with the same intervals. The rotors in the axial gap-type motor are referred to as Hp, Hq and Hr from the upstream to the downstream of the air flow during the forcible air cooling. The axial gap-type motor was fabricated by using Magnets F and E as inner and outer magnets of Hp, Magnets F and EH as inner and outer magnets of Hq, and Magnets FH and EH as inner and outer magnets of Hr, respectively.

In the same manner as in Example 2, the output after the rated operation and the 20% overloaded operation was measured, and the temperatures in the air intake port side and in the air exhaust port side were measured after both operations. The results are shown in Tables 4 and 5.

Comparative Example 6

The axial gap-type motor comprising the rotors having through-holes H was fabricated by using Magnets FH and EH as inner and outer magnets of Hp, Magnets FH and EH as inner and outer magnets of Hq, and Magnets FH and EH as inner and outer magnets of Hr, respectively. In the same manner as in Example 2, the output after the rated operation and the 20% overloaded operation was measured, and the temperatures in the air intake port side and in the air exhaust port side were measured after both operations. The results are shown in Tables 4 and 5.

Comparative Example 7

The axial gap-type motor comprising the rotors having through-holes H was fabricated by using Magnets F and E as inner and outer magnets of Hp, Magnets F and E as inner and outer magnets of Hq, and Magnets F and E as inner and outer magnets of Hr, respectively. In the same manner as in Example 2, the output after the rated operation and the 20% overloaded operation was measured, and the temperatures in the air intake port side and in the air exhaust port side were measured after both operations. The results are shown in Tables 4 and 5.

Example 4

The axial gap-type motor was fabricated by using the same two end rotors 32e having through-holes H as those in Example 3 and one stator 35, and using a casing having an air intake port parallel to the rotor and an air exhaust port in a radial direction. The axial gap-type motor had the same structure as in Example 2 except for the number of rotors, the number of stators, the air intake port, air exhaust port and through-holes.

Hereinafter, the rotors in this axial gap-type motor are referred to as Kp and Kq from the upstream to the downstream of the air flow during the forcible air cooling.

The axial gap-type motor was fabricated by using Magnets F and EH as inner and outer magnets of Kp, and Magnets F and EH as inner and outer magnets of Kq, respectively. Further, in the same manner as in Example 2, the output after the rated operation and the 20% overloaded operation was measured, and the temperatures in the air intake port side and in the air exhaust port side were measured after both operations. The results are shown in Tables 4 and 6.

Comparative Example 8

The same axial gap-type motor as in Example 4 was fabricated except that Magnets FH and EH as inner and outer magnets of Kp, and Magnets FH and EH as inner and outer magnets of Kq were used. In the same manner as in Example 2, the output after the rated operation and the 20% overloaded operation was measured, and the temperatures in the air intake port side and in the air exhaust port side were measured after both operations. The results are shown in Tables 4 and 6.

Comparative Example 9

The same axial gap-type motor as in Example 4 was fabricated except that Magnets F and E as inner and outer magnets of Kp, and Magnets F and E as inner and outer magnets of Kq were used. In the same manner as in Example 2, the output after the rated operation and the 20% overloaded operation was measured, and the temperatures in the air intake port side and in the air exhaust port side were measured after both operations. The results are shown in Tables 4 and 6.

It is evident in Tables 4 to 6 that the coercivity of the permanent magnet in the air intake port side can be made higher than that of the permanent magnet in the air exhaust port side also in the axial gap-type motor, thereby reducing the cost in the same manner as in the SPM motor.

Further, through-holes in the rotors increase the part where the permanent magnet having low coercivity can be placed, thereby further reducing the cost.

TABLE 4

|  |  | temperature measured in | | |
| --- | --- | --- | --- | --- |
|  | operation condition | air intake port side (° C.) | air exhaust port side (° C.) | estimated mean temperature (° C.) |
| Example 2 | rated operation | 25 | 65 | 45 |
|  | 20% overloaded operation | 25 | 90 | 57 |
| Example 3 | rated operation | 25 | 65 | 45 |
|  | 20% overloaded operation | 25 | 85 | 55 |
| Example 4 | rated operation | 25 | 55 | 45 |
|  | 20% overloaded operation | 25 | 80 | 53 |

TABLE 4-continued

| | | temperature measured in | | |
|---|---|---|---|---|
| | operation condition | air intake port side (° C.) | air exhaust port side (° C.) | estimated mean temperature (° C.) |
| Comp. Ex. 4 | rated operation | 25 | 65 | 45 |
| | 20% overloaded operation | 25 | 90 | 57 |
| Comp. Ex. 5 | rated operation | 25 | 65 | 45 |
| | 20% overloaded operation | 25 | 90 | 57 |
| Comp. Ex. 6 | rated operation | 25 | 65 | 45 |
| | 20% overloaded operation | 25 | 85 | 55 |
| Comp. Ex. 7 | rated operation | 25 | 65 | 45 |
| | 20% overloaded operation | 25 | 85 | 55 |
| Comp. Ex. 8 | rated operation | 25 | 55 | 40 |
| | 20% overloaded operation | 25 | 85 | 43 |
| Comp. Ex. 9 | rated operation | 25 | 55 | 40 |
| | 20% overloaded operation | 25 | 80 | 43 |

TABLE 5

| | difference (%) in outputs before and after operation, output with the same revolution number after the operation under the rated condition | | cost (%) of magnets relative to cost | |
|---|---|---|---|---|
| | rated operation | 20% overloaded operation | in Comp. Ex. 5 | in Example 2 |
| Example 2 | 0 | 0 | 112 | 100 |
| Comp. Ex. 4 | 0 | 0 | 124 | 111 |
| Comp. Ex. 5 | 0 | reduction by 30% | 100 | 89 |
| Example 3 | 0 | 0 | 112 | 100 |
| Comp. Ex. 6 | 0 | 0 | 124 | 111 |
| Comp. Ex. 7 | 0 | reduction by 5% | 100 | 89 |

TABLE 6

| | difference (%) in outputs before and after operation, output with the same revolution number after the operation under the rated condition | | cost (%) of magnets relative to cost | |
|---|---|---|---|---|
| | rated operation | 20% overloaded operation | in Comp. Ex. 7 | in Example 4 |
| Example 4 | 0 | 0 | 106 | 100 |
| Comp. Ex. 8 | 0 | 0 | 112 | 105 |
| Comp. Ex. 9 | 0 | reduction by 15% | 100 | 94 |

EXPLANATION OF SYMBOLS 10, 31 radial gap-type motor
11, 21, 31 rotation shaft
12, 22: rotor
13, 33: rotor core
14, 24, 24a, 24b, 24c, 24d: permanent magnet
15, 25, 35: stator
16, 26: stator core
17, 27, 37, 37a, 37b: coil
20: radial gap-type motor
28, 48: hole
32e: end rotor
32i: inner rotor
33e, 33i: disk-shaped structure
36: disk-shaped structure
FM: direction of field magnet
M: direction of magnetization
H: through-hole

The invention claimed is:

1. A permanent magnet rotating machine comprising:
a housing which houses a rotation shaft, at least two rotors connected to the rotation shaft in an axial direction of the shaft with a gap therebetween and configured to rotate together with the rotation shaft, at least one stator provided in the gap, and permanent magnets fastened to the at least two rotors or the at least one stator;
an air intake port provided at a first end of the housing and an air exhaust port provided at an opposite second end of the housing, the air intake port and the air exhaust port being configured to allow cooling air to flow through the housing and through holes formed inside of the at least two rotors and/or inside the at least one stator and along the rotation axis of the rotation shaft; and
a blower external to the housing for feeding the cooling air to the air intake port such that the cooling air flows through the housing from the housing first end to the housing second end through the holes formed inside of the at least two rotors and/or inside the at least one stator and along the rotation axis of the rotation shaft and exits the housing via the air exhaust port,
wherein the permanent magnet rotating machine is an axial gap type and configured to be driven by magnetic force of the permanent magnets, and among the permanent magnets, each permanent magnet near the housing second end has a higher coercivity than each permanent magnet near the housing first end.

2. The permanent magnet rotating machine according to claim 1, wherein the permanent magnet near the housing second end is a sintered magnet body having an $R^1$—Fe—B-based composition, $R^1$ representing at least one selected from rare earth elements inclusive of Y and Sc; and the permanent magnet is obtained by heating the sintered magnet body and a powder on a surface of the magnet body at a temperature equal to or lower than a sintering temperature of the magnet body under vacuum or in an inert gas, the powder comprising at least one selected from the group consisting of an oxide of $R^2$, a fluoride of $R^3$ and an oxyfluoride of $R^4$ wherein $R^2$, $R^3$ and $R^4$ each independently represents at least one element selected from rare earth elements inclusive of Y and Sc.

3. The permanent magnet rotating machine according to claim 1, wherein the permanent magnet near the housing second end and the permanent magnet near the housing first end are both sintered magnet bodies of the same $R^1$—Fe—B-based composition, $R^1$ representing at least one selected from rare earth elements inclusive of Y and Sc; and the permanent magnet near the housing second end is obtained by heating the sintered magnet body and a powder on a surface of the sintered magnet body at a temperature equal to or lower than a sintering temperature of the magnet body under vacuum or in an inert gas, the powder comprising at least one selected from the group consisting of an oxide of $R^2$, a fluoride of $R^3$, and an oxyfluoride of $R^4$ wherein $R^2$, $R^3$ and $R^4$ each independently represent at least one element selected from rare earth elements inclusive of Y and Sc.

4. The permanent magnet rotating machine according to claim 1, wherein the permanent magnet near the housing second end and the permanent magnet near the housing first end have substantially identical remanences within a range of ±0.02 tesla.

* * * * *